March 15, 1960 G. S. FENIMORE 2,928,610
SPRAYER BELL
Filed April 1, 1958
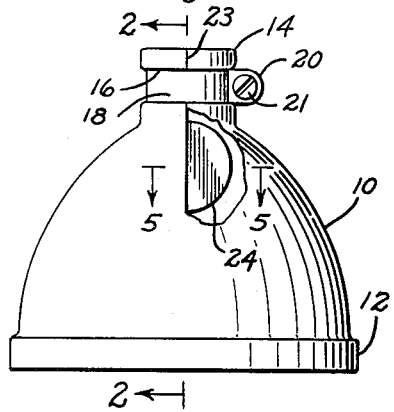
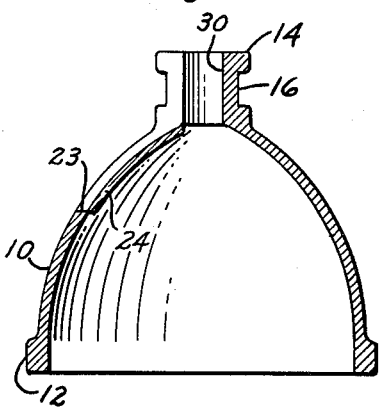
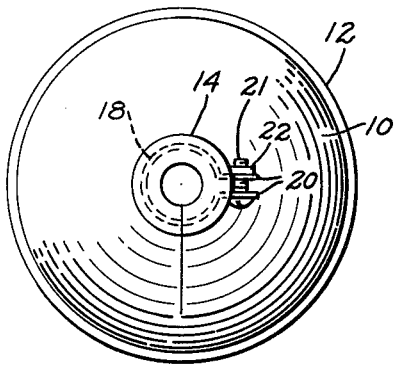
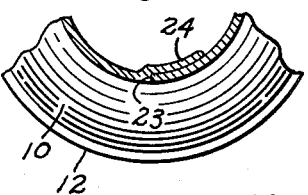
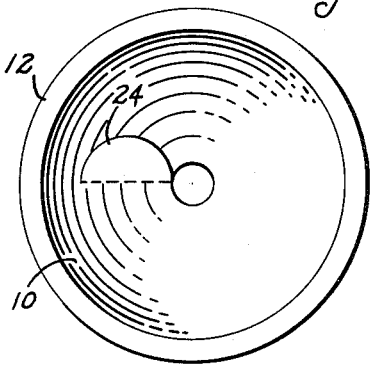
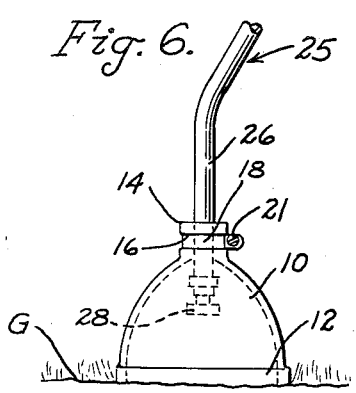
INVENTOR.
GEORGE S. FENIMORE
BY
McMorrow, Berman & Davidson
ATTORNEYS

United States Patent Office 2,928,610
Patented Mar. 15, 1960

2,928,610

SPRAYER BELL

George S. Fenimore, Gaston, Oreg.

Application April 1, 1958, Serial No. 725,651

4 Claims. (Cl. 239—288)

This invention relates to devices used in spraying various liquids, such as insecticides, weed-killing solutions, etc.

Since the invention has particular adaptability for use in spraying weeds with a weed-killing solution, it will hereinafter be described in terms of its use in this particular situation. However, such description is not to be considered as restrictive of the various uses to which the invention can be put, and therefore it will be readily understood that the invention is capable of many other possible usages, including the spraying of insecticides and various other liquids, particularly those which may be used in gardens or on lawns.

Weed-killing solutions are in widespread use, not only in large scale commercial enterprises, but also, by the ordinary householder. Such solutions are effective in killing broad-leaved plants, which of course includes most weeds. However, the solutions are not selective, and are dangerous to adjacent shrubs or cultivated plants.

In view of the above, the spraying of a weed-killing solution must be attended by considerable care, to insure that the solution will not drift to an adjacent shrub that one does not desire to damage in any way. The present invention aims to provide a means which will insure against said drifting of the spray, whereby the solution may be concentrated entirely on an individual weed, and will not possibly be blown or accidentally sprayed on a valuable shrub.

To this end, the invention, summarized briefly, comprises a bell-like or flaring shell secured to one end of a handle, said handle being a tubular conduit for the spray that is to be directed against the weed, with the shell being adapted to confine the sprayer nozzle. In this way, one may carry a suitable weed-killing spraying device in one hand, or strapped to his back or slung over his shoulder. In the other hand, the person may hold the tubular spray handle, on the nozzle end of which is fitted the flared, bell-like protector comprising the present invention. On locating a weed that is to be sprayed, one merely positions the shell over the weed, in engagement with the ground, and obviously the weed is completely enclosed with no possibility of seepage of the spray onto adjacent plants even though they may be quite close to the weed that is being sprayed.

In this connection, when the shell has been placed over the weed that is to be sprayed, the user may actuate the spraying device to direct a quantity of the weed-killer through the nozzle onto the enclosed weed. Thereafter, the device is merely lifted after the spray has been stopped, and is positioned over the next weed that is to be sprayed.

A more specific object of the present invention is to provide a device of the character stated that will be applicable to conventional spray nozzles without requiring any modification or redesign of said nozzles.

Another object of the present invention is to provide a device of the character described which, when applied to a conventional nozzle, will not interfere in any way with the spraying action of said nozzle.

Still another object of the invention is to provide a device as stated which can if desired be formed of a transparent material, such as transparent plastic, so that one can observe the spraying action within the device.

Still another object is to provide a sprayer bell as stated which will be of a deformable material, so that its periphery will conform to and engage firmly against the ground surface surrounding the weed, even though said surface may be slightly irregular, thus to prevent any of the sprayed solution from drifting outwardly from below the bell.

A further object of importance is to provide a means in said bell facilitating its attachment to or detachment from a conventional spray nozzle, in a manner such as to not require removal of the nozzle from its associated tubular handle, even though said nozzle may be of relatively large diameter as compared to the diameter of the nozzle.

Still another object is to so provide the mentioned connection of the device to a spray handle that even though it is readily attachable to the handle without requiring detachment of the nozzle from the handle, the device will still, when in its final mounted position have a tight sealing engagement about the handle.

Still another object is to so form the bell that it can be attached to the handle at a selected location along the length of the handle or discharge conduit, thus to locate the sprayer nozzle at any selected point along the length of the shell or sprayer bell forming the present invention.

Other objects will appear from the following description, the claims appended thereto and from the annexed drawing in which like reference characters designate like parts throughout the several views and wherein:

Figure 1 is an elevational view of a sprayer bell according to the present invention, a portion being broken away;

Figure 2 is a longitudinal sectional view therethrough substantially on line 2—2 of Figure 1;

Figure 3 is a top plan view of the sprayer bell;

Figure 4 is a bottom plan view thereof;

Figure 5 is an enlarged, detail sectional view substantially on line 5—5 of Figure 1; and Figure 6 is a reduced, side elevational view of the device applied to the discharge conduit and nozzle of a sprayer, said conduit being shown fragmentarily, the device being illustrated in operative position.

Referring to the drawing in detail, designated at 10 is a flared body of inverted cup shape. In accordance with the present invention, said body is made of a readily deformable soft plastic such as polyethylene. Alternatively, the device could be made of soft rubber or the like. It is mainly important, as will be readily seen from the following description, that the device be sufficiently deformable to conform to the contour of the ground G (see Figure 6) when in use. Further, pliability or ready deformability of the device is desirable so as to permit the same to be applied to or disengaged from a discharge conduit of a sprayer.

In any event, the body 10 is of bell shape, flaring in a downward direction and being formed wholly open at its lower larger end. At this end of the body, there is provided a thickened portion or bead 12, providing for a slight stiffening of the device at the larger end thereof. This adds a certain amount of strength to the device, which is desirable, while still leaving the same fully deformable for the purpose of permitting the same to conform or adjust itself to the contour of the ground.

In any event, the device comprising the present invention, at the smaller upper end 14 thereof, has a cylindrical neck. The neck is provided with an external, continuous circumferential groove 16 intermediate the opposite ends of the neck, adapted to receive a split ring clamp 18, such as a conventional hose clamp, a clamp of this type being provided with confronting ears 20 apertured to receive a screw 21 to which is applied a nut 22.

Designated at 23 is a slot extending longitudinally of the device. Slot 23 extends fully from the distal or upper end of the neck 14, to a location intermediate the ends of the flared portion of the body (see Figure 2). The slot is adapted to be closed over that part of its length that extends within the wall of the flared portion of the body 10 by a flap 24, in a manner to be described in greater detail hereinafter.

Designated generally at 25 is a conventional sprayer. Such a sprayer might be of any of various types of commercial or household garden sprayers. In a typical example, the sprayer may include a tank or cylinder holding compressed air, from which tank extends a flexible tube. Neither the tank nor the tube is shown, but the tube would be connected to an elongated, rigid tubular member 26, and at the location of the connection between the flexible tube and the member 26 there could be provided a valve handle or the like. The member 26 is a wand, capable of being directed at any point at which the liquid is to be sprayed through a conventional nozzle 28.

This is an ordinary type of sprayer, and the present invention is well adapted for use with a sprayer of this type, without requiring any modification or redesign whatever of the sprayer. The invention, thus, is applied to the wand or conduit 26 merely by splaying the walls of slot 23 sufficiently to permit the axial bore 30 of neck 14 to be enlarged temporarily, while at the same time defining a wide opening between the walls of that portion of slot 23 that extends within the flared part of body 10.

In any event, the nozzle 28, thought to constitute an enlargement on the discharge end of the conduit 26, need not be removed from the conduit. The deformable material of the device is simply grasped sufficiently to open the slot to allow the nozzle to be positioned therethrough. Thereafter, with the conduit engaged in the bore 30, the slot, by reason of the resiliency of the material used, is self-closing. However, it is desirable that there be no leakage of the spray material through the part of the slot that extends between the base of the neck and the lower end of the slot, viewing the same as in Figure 2. Accordingly, over this part of the length of the slot there is provided a semicircular relatively thin flap 24 integrally formed on one wall of the slot and disposed in contact with the inner surface of the body of the device. Said flap extends directly across the slot, and is so formed that it automatically moves to the Figure 4 position, so as to prevent leakage of the sprayed material through the slot.

After the device is applied to the conduit, it can be shifted longitudinally of the conduit to a selected location, so that the nozzle 28 will be disposed at a selected distance from the open, larger end of the device. Then, the hose clamp 18 is applied and is tightened about the neck, sealably engaging the neck about the conduit.

The device is now ready for use, and one merely positions the same over a weed, thereafter releasing the spray so that the nozzle is caused to direct the spray against the weed. No leakage of the material occurs, since the larger end of the body conforms to the ground to prevent the sprayed mist from seeping under the device. Furthermore, the slot 23 is fully closed, and in addition, there is no seepage through the bore 30.

When the weed has been sufficiently sprayed, the device is merely lifted off the weed, and is moved to a new location, in position over the next weed that is to be sprayed.

It will be seen that the sprayer device is such as to permit the same to be applied to any of various weeds without danger of causing the mist to drift onto an adjacent, valuable shrub. This is true even though the device is used directly alongside a plant or shrub that one does not desire to harm.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles it being considered that the invention comprehends any minor change in construction that may be permitted within the scope of the appended claims.

What is claimed is:

1. A guard for a sprayer having a discharge conduit and a nozzle, comprising a bell-shaped, readily deformable body formed open at both its smaller and larger ends, said body having a longitudinal slot extending from the smaller end thereof to a location intermediate the body, said deformable nature of the body being adapted for splaying of the walls of the slot to permit entrance of the nozzle and the conduit for engaging the body about said nozzle and conduit; clamp means extendable about the smaller end of the body for clampably engaging the same with the discharge conduit; and a flap on the inner surface of the body extending across the slot to close the same.

2. A guard for a sprayer having a discharge conduit and a nozzle, comprising a bell-shaped, readily deformable body formed open at both its smaller and larger ends, said body having a longitudinal slot extending from the smaller end thereof to a location intermediate the body, said deformable nature of the body being adapted for splaying of the walls of the slot to permit entrance of the nozzle and the conduit for engaging the body about said nozzle and conduit; clamp means extendable about the smaller end of the body for clampably engaging the same with the discharge conduit; and a flap on the inner surface of the body extending across the slot to close the same, the smaller end of the body being in the form of a generally cylindrical neck, said slot extending continuously the full length of the neck.

3. A guard for a sprayer having a discharge conduit and a nozzle, comprising a bell-shaped, readily deformable body formed open at both its smaller and larger ends, said body having a longitudinal slot extending from the smaller end thereof to a location intermediate the body, said deformable nature of the body being adapted for splaying of the walls of the slot to permit entrance of the nozzle and the conduit for engaging the body about said nozzle and conduit; clamp means extendable about the smaller end of the body for clampably engaging the same with the discharge conduit; and a flap on the inner surface of the body extending across the slot to close the same, the smaller end of the body being in the form of a generally cylindrical neck, said slot extending continuously the full length of the neck, the neck having an external circumferential groove in which the clamp means is engaged.

4. A guard for a sprayer having a discharge conduit and a nozzle, comprising a bell-shaped, readily deformable body formed open at both its smaller and larger ends, said body having a longitudinal slot extending from the smaller end thereof to a location intermediate the body, said deformable nature of the body being adapted for splaying of the walls of the slot to permit entrance of the nozzle and the conduit for engaging the body about said nozzle and conduit; clamp means extendable about the smaller end of the body for clampably engaging the same with the discharge conduit; and a flap on the inner surface of the body extending across the slot to close the same, the smaller end of the body being in the form of a generally cylindrical neck, said slot extending continuously the full length of the neck, said flap extending over that portion of the length of the slot that is formed in the bell-shaped portion of the body, the flap terminating at one end at the base of the neck.

References Cited in the file of this patent

UNITED STATES PATENTS

| | | |
|---|---|---|
| 998,126 | Sherk | July 18, 1911 |
| 1,064,331 | Inglehart | July 10, 1913 |